United States Patent [19]
Nolf et al.

[11] Patent Number: 5,317,797
[45] Date of Patent: Jun. 7, 1994

[54] METHOD OF ENCLOSING A SUBSTRATE WITHIN A HEAT-SHRINKABLE SLEEVE

[75] Inventors: Jean-Marie E. Nolf, Korbeek-Lo; Alain Wambeke, Zoutleeuw, both of Belgium

[73] Assignee: Raychem Corporation, Menlo Park, Calif.

[21] Appl. No.: 910,091

[22] PCT Filed: Jan. 12, 1991

[86] PCT No.: PCT/GB91/00036
§ 371 Date: Jul. 13, 1992
§ 102(e) Date: Jul. 13, 1992

[87] PCT Pub. No.: WO91/10355
PCT Pub. Date: Jul. 25, 1991

[30] Foreign Application Priority Data
Jan. 12, 1990 [GB] United Kingdom ............... 9000679

[51] Int. Cl.⁵ ............................................. B23P 11/02
[52] U.S. Cl. ............................. 29/447; 264/DIG. 71; 174/DIG. 8; 156/86

[58] Field of Search .................. 29/447, 868; 403/273; 285/381; 264/230, DIG. 71; 156/85, 86; 174/84 R, 92, DIG. 8

[56] References Cited
U.S. PATENT DOCUMENTS
4,648,924 3/1987 Nolf .................................... 264/230

Primary Examiner—Mark Rosenbaum
Assistant Examiner—David P. Bryant
Attorney, Agent, or Firm—Herbert G. Burkard; William D. Zahrt, II; A. Stephen Zavell

[57] ABSTRACT

A method of enclosing a substrate within a heat-shrinkable sleeve, which comprises the steps of:
a) attaching to the substrate a slideway;
b) attaching to the slideway a clip having at least two legs;
c) positioning a heat-shrinkable sleeve around the substrate;
d) sliding the clip by means of the slideway and with respect to the substrate such that at least one portion of the sleeve becomes positioned between the legs of the clip, and
e) causing heat-shrinkage of the sleeve.

9 Claims, 3 Drawing Sheets

METHOD OF ENCLOSING A SUBSTRATE WITHIN A HEAT-SHRINKABLE SLEEVE

The present invention relates to a method of enclosing a substrate, particularly to provide environmental protection, especially by employing a heat-shrinkable sleeve, and preferably where the substrate comprises a cable or a pipe, particularly a telecommunications cable.

Environmental protection is required around cable splices generally to make good a cable Jacket that has been removed from the cable ends to expose the internal conductors for electrical (or optical) splicing. A cable splice case is built up around the cable splice such that it bridges intact cable Jacket at each side of the splice. In this way contaminants such as moisture can be kept away from the otherwise exposed conductor splices. Splice cases are now commonly made by installing around the splice a dimensionally-recoverable, usually heat-shrinkable, sleeve. A heat-shrinkable sleeve may be supplied over-size, and then heated to cause close, environmentally-sealing, fitting to the underlying cable splice. A wrap-around heat-shrinkable sleeve is disclosed in GB 1155470 (Raychem).

A sleeve may be installed directly over the cable splice or other substrate to be protected, or a liner or other article may first be installed and the sleeve then shrunk around the liner. Such a liner may give mechanical strength to the resulting splice case, may protect the substrate from the heat applied during heat-shrinkage of the sleeve, or may add to the water-vapour barrier properties of the sleeve. Where the substrate is of non-uniform cross-sectional size (as in the case of a cable splice that is of larger diameter at its centre, and tapers down to the diameter of the spliced cables at its ends) the liner may serve to render the changes in size smooth thereby facilitating installation of the sleeve. In order to do this the liner may have frusto-conical ends, which may be produced by providing tapering fingers at the ends of a cylinder (giving the appearance of crowns) which are then bent inwards towards the axis of the cylinder. The cylinders may, for example, comprise two half-shells or may result from rolling up an initially substantially flat sheet. Such liners are described in GB 1431167 (Raychem).

The ability to communicate with the inside of a splice case may be useful, for example to monitor or to change conditions therein. For example, some telecommunications cables are pressurized with dry air to protect them, and pressure access points are needed for supply of air or for testing. In order to do this some line such as a pressure-access tube must pass through the sleeve, or between the sleeve and the substrate enclosed thereby. This has been suggested in, for example, EP 0244209 (Raychem) which discloses provision of a valve in the sleeve. Electrical or other communication may be required for other purposes, and GB 2112224 (Raychem) may be cited as a further example.

A different approach is taken in U.S. Pat. No. 4400579 (the disclosure of which is incorporated herein by reference) which relates principally to sealing a branch-off between two cables using a heat-shrinkable sleeve and a clip between them that forms two conduits in an end of the sleeve. That patent discloses an assembly comprising a heat-shrinkable sleeve capable of being positioned around at least first and second elongate substrates, and a clip having at least two elongate legs capable of being positioned over the outer surface of the sleeve at an end thereof so as to form, and maintain during subsequent heat-shrinkage of the sleeve, at least two terminal conduits respectively capable of receiving the first and second substrates, the clip optionally being formed as a trident with the central leg of the trident inside the sleeve. The central leg of the trident may be hollow to provide an inlet for pressurized air within a cable splice. That is illustrated in FIG. 14, and FIG. 15 shows an alternative where a two-legged clip is used together with a separate inlet that acts as a second separate branching substrate.

The combined clip and valve of FIG. 14 of U.S. Pat. No. 4400579 might, however, be difficult to use under certain conditions, and we have now devised a modified technique for forming an enclosure using a clip.

Thus, the present invention provides a method of enclosing a substrate within a heat-shrinkable sleeve, which comprises the steps of:
(a) attaching to the substrate a slideway;
(b) attaching to the slideway a clip having at least two legs;
(c) positioning a heat-shrinkable sleeve around the substrate;
(d) sliding the clip by means of the slideway and with respect to the substrate such that at least one portion of the sleeve becomes positioned between the legs of the clip; and
(e) causing heat-shrinkage of the sleeve.

These method steps may be carried out in any suitable order.

The substrate is preferably elongate, and more preferably comprises a pipe or a cable such as a telecommunications cable. In particular, it comprises a cable splice. Step (a) preferably comprises fixing the slideway against movement along the substrate, and step (a) preferably comprises sliding the clip along the slideway. When we refer to a component (such as the slideway) being fixed, we merely mean fixed against the sort of forces that it is likely to encounter. Thus, in the embodiment referred to, sliding of the clip causes the clip to slide with respect to the slideway which is preferably not displaced by friction of the sliding clip.

The slideway may comprise first and second parts that move telescopically with respect to one another, the first part being attached to the substrate and the second part being attached to the clip.

In another embodiment the substrate is elongate, and the slideway is attached to the substrate to allow movement thereof along the substrate, and the clip is fixed to the slideway against movement along the slideway.

The slideway preferably comprises a tube, preferably a substantially rigid tube, preferably comprising metal, and preferably having means such as a valve that can control passage of fluid therethrough.

In some embodiments the slideway is elongate and at least when installed provides a fixed third leg of the clip, preferably positioned between and substantially aligned with said two legs, step (d) resulting in a loop of sleeve passing between said two legs and around the slideway. In presently preferred embodiments, however, the slideway is elongate and at least when installed passes through a bridge portion Joining said two legs of the clip such that the slideway is preferably positioned between, is substantially aligned with and is slidable with respect to said two legs, step (d) resulting in a loop of sleeve passing between said two legs and around the slideway.

Particularly where the slideway or some other component is intended to provide fluid communication between the environment and the inside of the resulting enclosure, the slideway is preferably positioned such that it extends from a position that becomes enclosed by the sleeve to a position that remains outside the sleeve. The seal provided by a heat-shrinkable sleeve is often enhanced by the presence of a coating of a hot-melt adhesive or other sealing material on an inner surface of the sleeve, which sealing material may flow on heat-installation of the sleeve to fill any voids that would otherwise remain as leak paths. It is desirable that such sealing material does not block the end of the slideway to be within the final enclosure, and the slideway is therefore preferably fixed to the cable such that that end remains at the same position. The clip is then preferably slid along the slideway to engage the sleeve.

The sleeve is preferably installed after a liner has been correctly positioned around the cable splice, and a liner having crowned ends (see GB 1431167 referred to above) may be located by taping its crowned ends onto the cables. With the crowned ends thus secured it would in general be impossible to force a pressure access tube past the crowns into the splice case volume within, which is where an end of the tube must be if it is not to become blocked with sealing material. Thus, such a tube should be installed before (or during) installation of the liner, and therefore before installation of the sleeve. This desirable or essential sequence of installation steps prevents use of a clip bearing a valve tube (such as that shown in FIG. 14 of U.S. Pat. No. 4400579, referred to above) since the clip must be slid over the sleeve after substantially correct positioning of the sleeve. This problem is overcome by the present invention.

A clip that is attached to the slideway may serve to form a branch-off between two substrates that is to be sealed by the sleeve. We presently prefer, however, that said clip serves only to locate the slideway and to help seal around it, preferably by causing or facilitating conformance of the sleeve around it. Where a branched cable splice requiring pressure access is to be sealed, we prefer that branch-off clips be used that are separate from, and act independently of, the clip plus slideway of the present invention.

The slideway can be fixed with respect to the cable in any suitable way. At present, at least where the slideway comprises an elongate tube, we prefer that at least one and preferably two or more collars be provided around the slideway. These collars may then be secured to the cable by for example tapes, bands or hose clamps such those known by the Trade Mark "Jubilee Clips"). The collars may have a circumferentially-extending recess for receipt of the band or tape etc. The collars may hold the slideway a small distance (for example 1-5 mm) from the cable so that the clip, through a hole in which the slideway may pass, is free to move.

One such collar is preferably positioned at (or inwardly) of the position to which the ends of the crowns of a liner will reach. Then, and if means is provided on the slideway preventing it being slid out of that collar, the end of the slideway will be retained inside the liner and undesired blocking of it by adhesive during installation will be avoided. We prefer that the crown ends meet the collar, and are taped down onto it.

An end of the slideway that remains outside the sleeve is preferably angled away from the cable for ease of connection to an air supply line or pressure gauge. That end may also be provided with a valve such as that known by the Trade Mark, "SCHRADER", and optionally with a valve cap.

The slideway and/or the clip may be coated, or otherwise used with, a sealing material such as a hot melt adhesive.

The slideway and/or the clip may serve also as electrical communication to the inside of the sleeve, for example for connection to the shield layer of the cable which will in general be exposed at the end of the cable jacket.

If desired, the legs of the clip may be moveable relative to one another, and/or moveable in orientation relative to that of the slideway. Movement together of the legs and locking in that configuration after the clip has been brought to the sleeve may facilitate installation.

The sleeve may comprise any suitable material, particularly one based on cross-linked polyolefin and preferably coated with a polyamide or other hot-melt adhesive. A preferred sleeve comprises a fibre-reinforced composite material, particularly one that is heat-shrinkable by virtue of heat-shrinkable fibres therein. Such a composite material may be reinforced by non-shrinkable fibres, for example glass. The sleeve is preferably of wraparound design.

The invention is further illustrated with reference to the accompanying drawings, in which FIG. 1 shows a prior art branch-off clip incorporating a valve;

Figure 1:
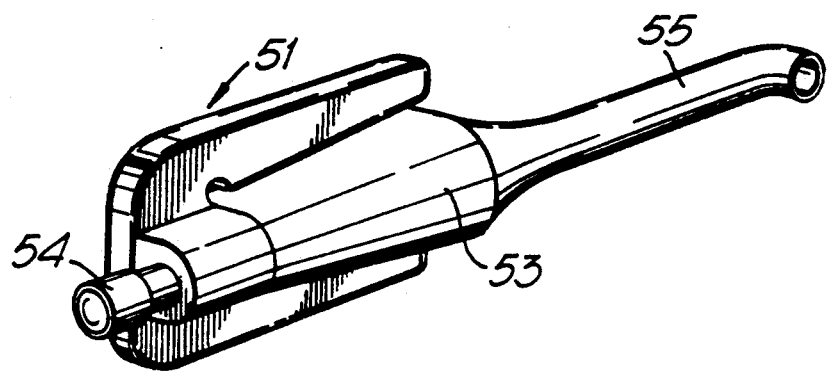
Figure 2:
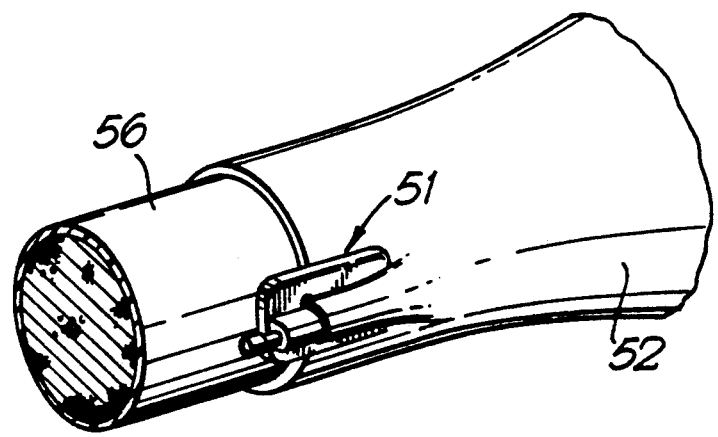
FIG. 2 shows the prior art clip of FIG. 1 in use with a heat-shrunk sleeve around a cable.

FIG. 1 shows a prior art branch-off clip 51 incorporating a valve as shown in FIG. 14b of U.S. Pat. No. 4400579 (Raychem). The clip is a trident whose central leg 53 is hollow and is provided with a valve 54 and an inlet duct 55. The central leg 53 acts as a substrate in the branch-off technique disclosed in that prior art. The way in which that branch-off is made is shown in FIG. 2 (FIG. 14a of U.S. Pat. No. 4400579). The clip 51 is simply positioned over the end of a sleeve 52 (shown partially) so as to form two conduits in the sleeve, one of which is occupied by a cable 56 and the other by the central leg 53 of the clip. The hollow central leg 53 therefore provides pressure access into the enclosure formed by the sleeve (ie into the right hand part of the sleeve, most of which is omitted from the drawing). The sleeve 52 is shown in its shrunk state in which it can be seen tightly to engage the cable 56 and the central leg 53.

Figure 3:
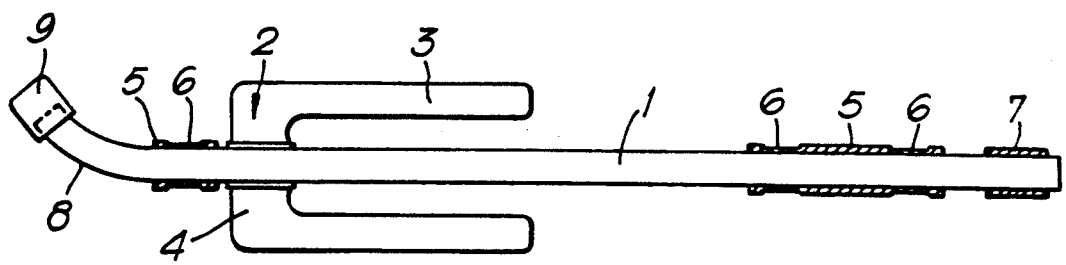
FIGS. 3-5 show various clip and valve combinations.

FIG. 3 shows a slideway 1 to which a clip 2 is attached such that the clip can slide along the slideway. The clip comprises two legs 3 and a bridge portion 4 which may be of any suitable shape and preferably through which the slideway passes. The clip may have a hollow middle leg aligned with the legs 3 and through which the slideway 1 passes. That middle leg may be coated with or may comprise a hot-melt adhesive or other sealing material. Collars or other means 5 are provided by means of which the slideway can be fixed or otherwise attached to a cable or other substrate. The collars 5 may have circumferentially-extending recesses or holes 6 therein by means of which the collars may be fixed by bands etc to an underlying cable. The slideway may have an end cap 7 or other means, for example of interference fit to prevent complete withdrawal of the slideway through the collar 6. An end of the slideway that remains exposed may be shaped as at 8 away from an underlying substrate for ease of access to a valve 9 etc that it may carry.

Figure 4:
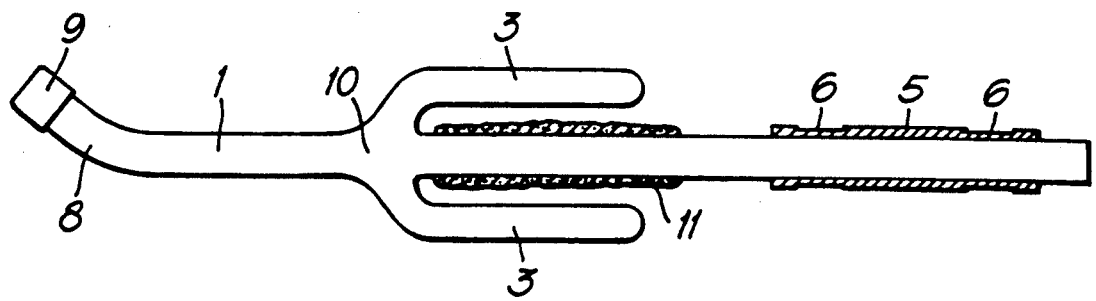

FIG. 4 is similar to FIG. 3 except that the slideway 1 is intended to slide with respect to a cable on which it is to be mounted. The slideway slides within a collar 5, and the clip 3 is fixed with respect to, and may be integral with (at position 10) the slideway 1. A portion of the slideway may be coated or otherwise supplied with a hot-melt adhesive or other sealing material 11. If desired, such a sealing material may be supplied separately in this or other embodiments.

Figure 5:
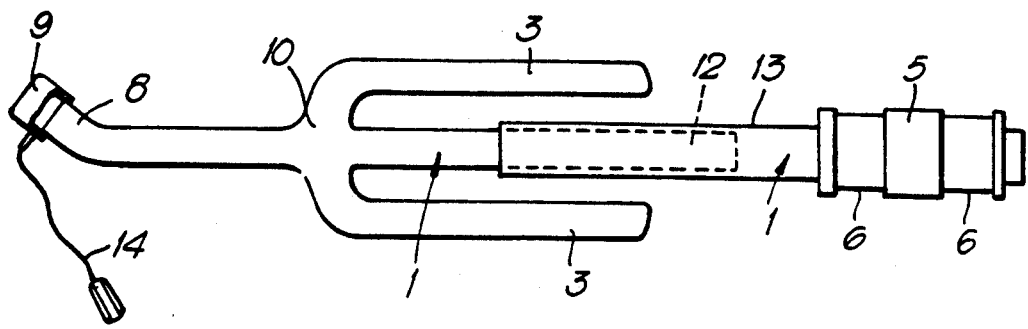

In FIG. 5 the slideway 1 is in (at least) two telescopic parts 12 and 13 one of which can slide within (or adjacent) the other. One or each part may be coated with or comprise a hot-melt adhesive or other sealing material. An electrical connection, such as a lead 14, is provided which can allow communication into a splice case which the slideway and clip help to form.

Any of the clips used in the invention may be provided with legs that are fixed or are moveable with respect for example to one another. Moveable legs may facilitate positioning of the clip correctly with respect to the sleeve. For example, the clip may be slid into position and the legs then correctly positioned with respect to each other and/or with respect to the slideway. In a preferred embodiment, each leg is pivotally fixed to a bridge portion of the clip such that the distal ends of the legs can swing together to meet the sleeve. A locking mechanism may be provided to prevent them opening out again in use.

Figure 6:
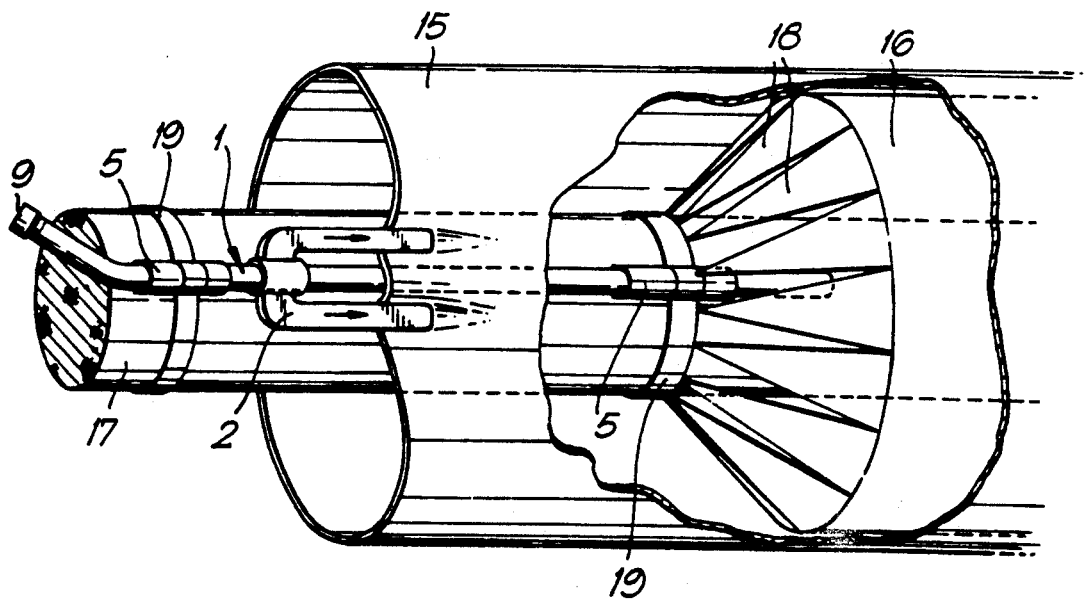
FIG. 6 shows a clip and valve being used according to the invention.

Formation of a splice case is shown in FIG. 6. Here a heat-shrinkable sleeve 15 is positioned around a cable 17, which may be spliced to one or more other cables within the sleeve, to the right-hand side of the part of the sleeve illustrated. A liner 16 surrounds the cable and splice within the sleeve 15, and a crowned end of the liner 18 has tapered fingers thereof bent inwards towards the axis of the liner and down onto the cable. The fingers may be taped in that configuration to locate the liner with respect to the cable. The collars 5 are secured to the cable 17 by bands 19 that pass around the cable and around or through the collars 5. The crowns 18 are preferably aligned with and optionally taped down onto one of the collars 5 and corresponding band 19. After the slideway i has been located with respect to the cable 17 by means of the collar 5 and bands 19 and the liner 16 and sleeve 15 put in place, the clip 2 is slid in the direction of the arrows over an end of the sleeve, thus deforming the sleeve around the slideway. The sleeve is then shrunk to produce a sealed outlet thereof analogous to that shown in FIG. 2. The sleeve may be internally coated with a hot-melt adhesive or other sealing material to improve the seal between it and the underlying cable.

For the avoidance of doubt, it is here noted that the invention provides articles, methods and kits for enclosing a substrate or providing pressure access or other communication. Any one or more of the clips, slideways, fastening devices, sleeves or liners may be selected.

We claim:

1. A method of enclosing a substrate within a heat-shrinkable sleeve, which comprises the steps of
    (a) attaching a slideway to the substrate;
    (b) positioning a heat-shrinkable sleeve around the substrate;
    (c) sliding a clip, having at least two legs being attavched to the slideway, with respect to the substrate such that at least one portion of the sleeve becomes positioned between the legs of the clip; and
    (d) heating the sleeve to cause heat-shrinkage thereof.

2. A method according to claim 1, in which the substrate comprises an elongate substrate, step (a) comprises fixing the slideway against movement along the substrate, and step (c) comprises sliding the clip along the slideway.

3. A method according to claim 1, in which the slideway comprises first and second parts that can move telescopically with respect to one another, the first part being fixed to the substrate and the second part being fixed to the clip.

4. A method according to claim 1, in which the substrate comprises an elongate substrate and the slideway is attached to the substrate to allow movement thereof along the substrate, and the clip is fixed to the slideway against movement along the slideway.

5. A method according to claim 1, in which the slideway comprises a tube.

6. A method according to claim 5, in which means is provided that can control passage of fluid through the tube.

7. A method according to claim 1, in which the slideway is positioned such that it extends from a position that becomes enclosed by the sleeve to a position that remains outside the sleeve, thereby providing communication between the inside and outside of an enclosure formed by shrinking the sleeve around the substrate.

8. A method according to claim 1 in which the clip has first and second legs substantially aligned with each other, and the slideway is elongate and provides a third leg positioned between the substantially aligned with the first and second legs, and the step of sliding the clip with respect to the substrate such that at least one portion of the sleeve becomes positioned between the legs of the clip results in a loop of the sleeve fastened between the first and second legs and around the slideway.

9. A method according to claim 1 in which the clip has first and second legs substantially aligned with each other and joined by a bridge portion, and the slideway is elongated and passes through the bridge portion such that the slideway is positioned between and is substantially aligned with and is slideable with respect to the first and second legs, and the step of sliding the clip with respect to the substrate such that at least one portion of the sleeve becomes positioned between the legs of the clip results in a loop of sleeve passing between said two legs and around the slideway.

* * * * *